A. A. BULL.
WATER CIRCULATION SYSTEM FOR INTERNAL COMBUSTION ENGINES.
APPLICATION FILED AUG. 11, 1916.
1,274,507.
Patented Aug. 6, 1918.
3 SHEETS—SHEET 1.
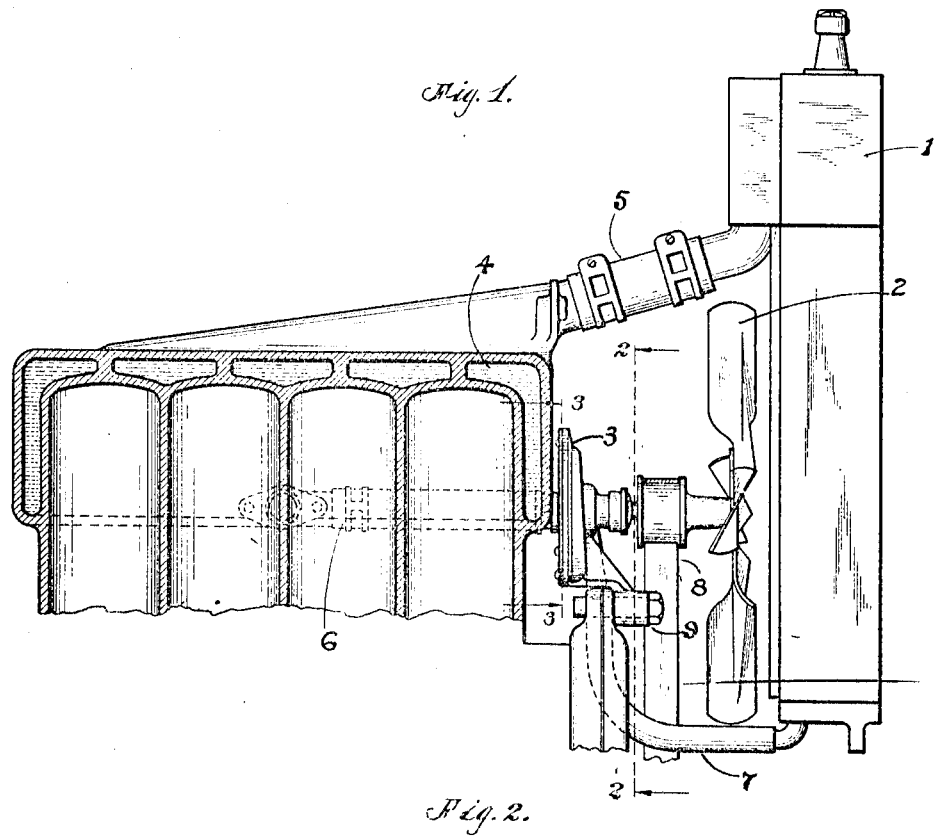
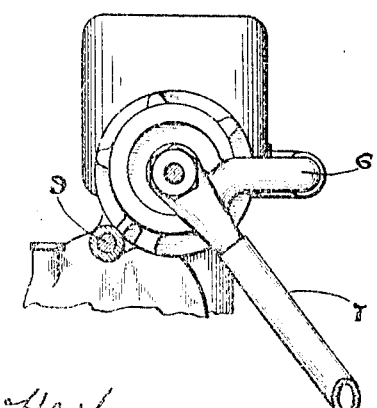
WITNESSES:
Fred A. Harper
Joseph Bull
INVENTOR
A. A. Bull A. A. BULL.
WATER CIRCULATION SYSTEM FOR INTERNAL COMBUSTION ENGINES.
APPLICATION FILED AUG. 11, 1916.

1,274,507.

Patented Aug. 6, 1918.
3 SHEETS—SHEET 2.

WITNESSES:
Fred A Harper
Joseph Bull

INVENTOR

BY

ATTORNEY

A. A. BULL.
WATER CIRCULATION SYSTEM FOR INTERNAL COMBUSTION ENGINES.
APPLICATION FILED AUG. 11, 1916.

1,274,507.

Patented Aug. 6, 1918.
3 SHEETS—SHEET 3.

UNITED STATES PATENT OFFICE.

ARTHUR ALBERT BULL, OF DETROIT, MICHIGAN.

WATER-CIRCULATION SYSTEM FOR INTERNAL-COMBUSTION ENGINES.

1,274,507.

Specification of Letters Patent.

Patented Aug. 6, 1918.

Application filed August 11, 1916. Serial No. 114,420.

*To all whom it may concern:*

Be it known that I, ARTHUR ALBERT BULL, a subject of the King of Great Britain, and a resident of Detroit, in the county of Wayne and State of Michigan, United States of America, have invented new and useful Improvements in Water-Circulation System for Internal-Combustion Engines, of which the following is a specification.

My invention relates to improvements in the application of a pressure pump for use in circulating the cooling water commonly employed in internal combustion engines.

The primary object of the invention is to provide a positive pressure water circulator of simplified construction and application, and to be driven or operated in combination with the fan usually applied on internal combustion motors for use with motor vehicles.

A further object of the invention is to provide a positive circulation pump and connections which can be adapted to motor vehicle engines that have no pressure water circulation included as regular equipment, without the necessity for structural alterations, utilizing the existing fan driving means to operate the pressure pump.

A still further object of the invention is to provide a circulation pump with its connecting pipes, to be operated in combination with the fan, and means adapted to pivotally mount the said pump and fan that the driving means may be adjusted for correct operation.

A still further object of the invention is to provide a positive circulation pump, simple in construction, driven in combination with and by means adapted to drive the fan, pivotally mounted to permit of adjustment of the flexible driving medium, which is usually in the form of a friction belt, riding upon pulleys upon the fan and engine shafts respectively, forming a combination for the conversion from natural to forced circulation of the cooling system.

The invention consists of the features of construction, combination and arrangement of parts herein fully described and claimed, reference being had to the accompanying drawings in which:—

Figure 1 is a side elevation, partly in longitudinal section of the installation.

Fig. 2 is an end elevation on the line 2—2 of Fig. 1,

Figure 3:
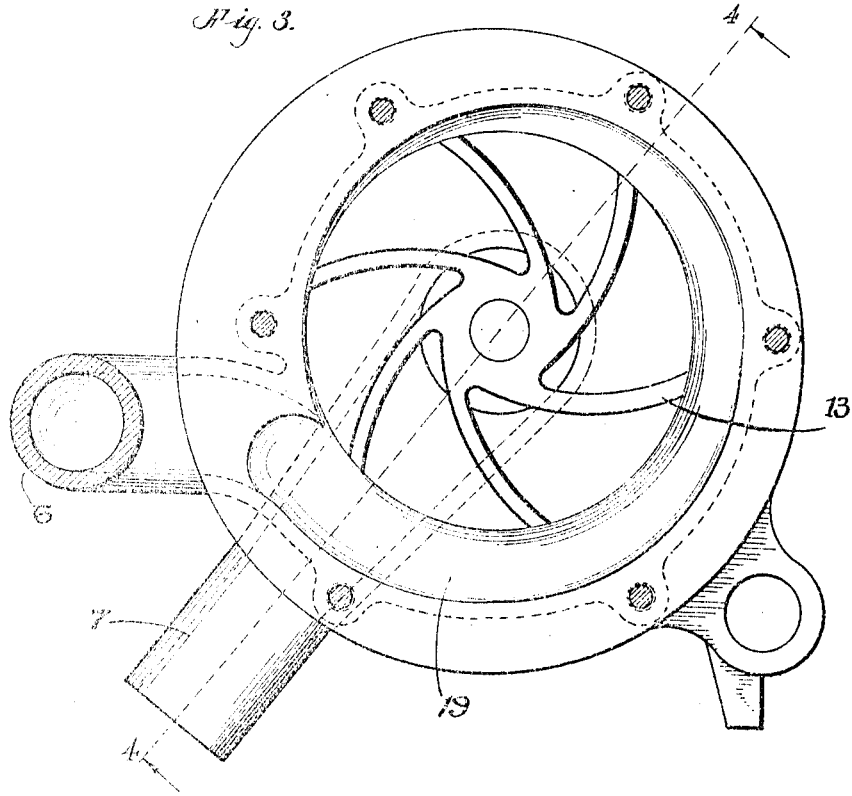
Fig. 3 is a transverse section on the line 3—3 of Fig. 1 of the pump proper.

Referring to Figs. 1 and 2 showing the complete water circulation system as applied in practice, in which 1 is the radiator from which the water is drawn and forced through the water jackets of the engine by the pump 3 which in this case is driven in combination with the fan 2 and by the fan belt 8, the water being circulated by way of the outlet pipe 7 through the pump 3 and the inlet pipe to the cylinder 6 returning to the radiator through the hose pipe 5.

The pump is pivotally mounted upon the stud 9, adjustment of the driving belt being accomplished by angular rotation of the pump around the said stud, the connecting pipes 6 and 7 being of flexible material such as rubber hose.

In practice the parts are assembled to the motor in the location shown, the pump 3 taking the place of the arm or bracket usually provided to carry the fan.

Thus it will be understood, that, from the location and description of the parts comprising the water circulation system, a motor designed with a natural or so called thermo-siphon circulation water cooling system, can be easily converted to a forced circulation system by the adaptation of the pressure pump 3 and the connecting pipes 6 and 7, utilizing the same driving means as applied to the fan itself.

Figure 4:
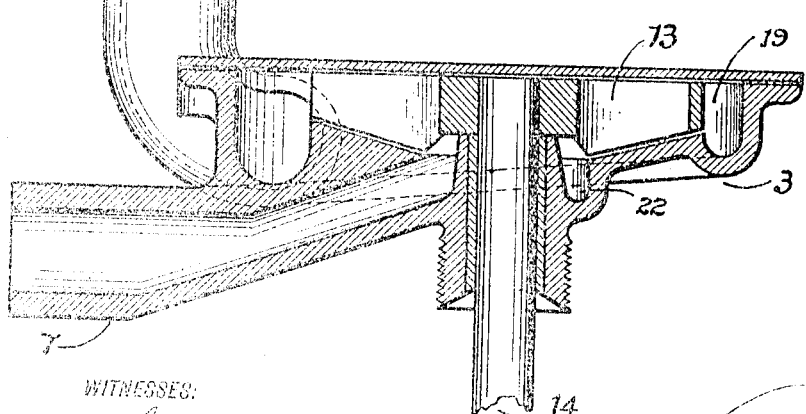
Fig. 4 is a transverse section on the line 4—4 of Fig. 3, with the packing nut omitted.
Figure 5:
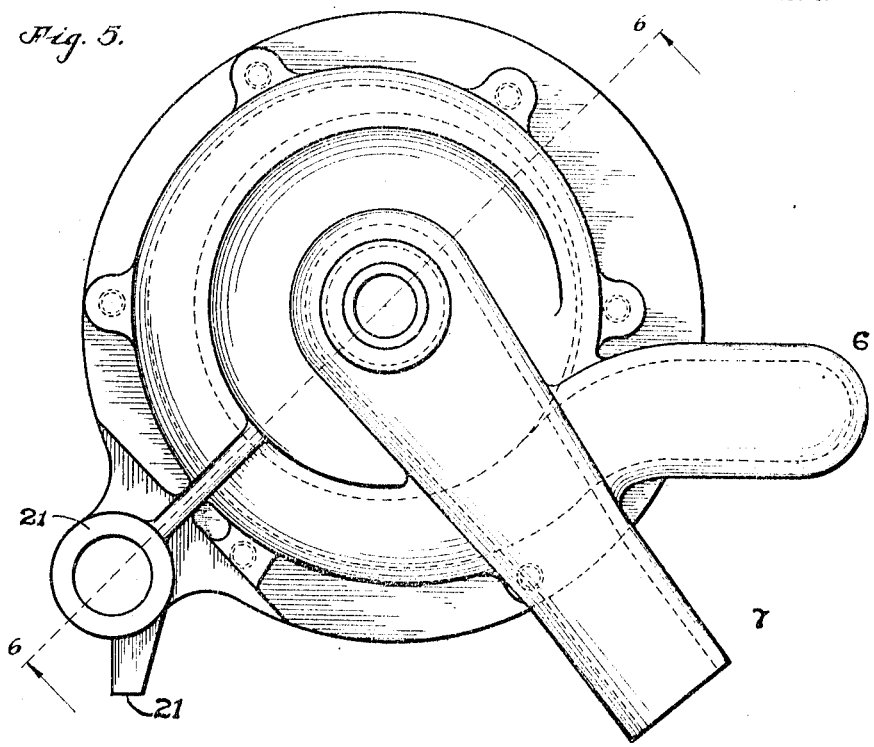
Fig. 5 is an end elevation of the pump body.
Figure 6:
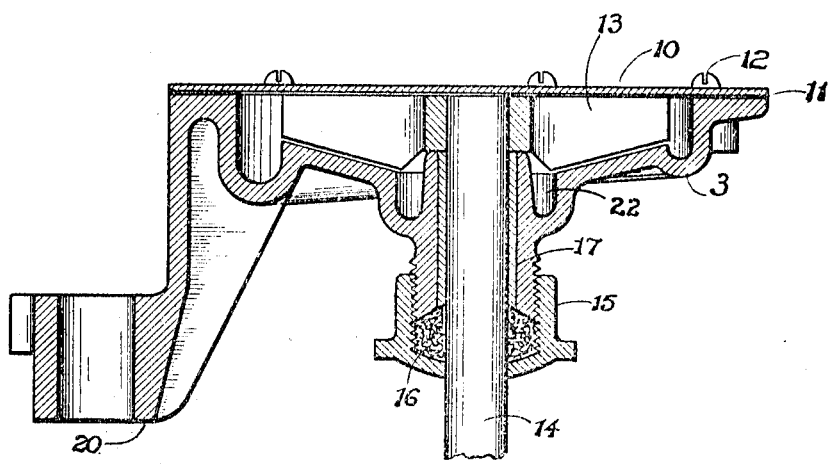
Fig. 6 is a transverse section of the pump body on the line 6—6 of Fig. 5.

In Figs. 3 to 6 inclusive I have shown the detailed construction of the pump in which I embody economical and simplified features of construction.

The body 3 of the pump is constructed with a recessed chamber 19, the said chamber having an angular side and being enlarged radially and in width in the form of a volute, increasing in area toward the discharge orifice 6.

Upon a shaft 14 revolubly mounted in the body 3 and upon which the fan is also mounted and driven, is the rotor 13 which is housed and in practice rotates inside the chamber 19 of the body 3.

Upon the said rotor 13 are formed blades extending radially from the hub, the said blades in practice communicating with the annular inlet chamber 22 and orifice 7 of the pump body.

Inclosing the chamber and rotor is the plate 10 and gasket 11 which plate is attached by the screws 12.

At the end of the body remote from the water chamber is the gland nut 15 and packing material 16 the object of which is to prevent the leakage of the fluid from the chamber.

Upon the body 3 is formed the lug 20 into which the stud upon which the pump pivots is fitted, while the small extension or lug 21 serves as a stop to hold the pump in position while being adjusted and resists the tension of the driving means in operation.

It will be noticed that in this structure all the intricate casting and machine work is incorporated in the body 3, the cover 10 serving only to retain the fluid in the pressure chamber.

The application and mode of operation will be understood from the foregoing description.

I claim—

1. A device of the character described comprising a pressure circulating pump unit, adaptable to an engine employing fluid cooling means, to convert said cooling means from natural to positive pump circulation, the said unit being separable therefrom and not essentially an integral part thereof, adapted to function as a supporting member for the existing cooling fan and operated thereby, and capable of angular rotation providing for the adjustment of the fan driving means.

2. A device of the character described, comprising a centrifugal fluid pump unit, adapted to be positioned upon an internal combustion engine, utilizing existing driving means, pivotally mounted, and as a unit independent of the cylinders of the said engine and separable therefrom supporting and operated by the cooling fan and its driving means, consisting of a pump body with inlet and outlet pipes integral therewith and extending therefrom, a rotor in a chamber, upon a shaft journaled therein, said shaft extending at one end therefrom and a plate inclosing said rotor.

3. A device of the character described comprising a fluid pressure pump and communicating pipes mounted as a unit upon an engine, adapted to function as the supporting means for the cooling fan, adjustably mounted, on a pivot to provide adjustment for the fan driving means, said unit comprising a pump body, a rotor therein, a shaft journaled therein and extending therefrom to accommodate the cooling fan.

ARTHUR ALBERT BULL.